(12) United States Patent
Brinkhuis et al.

(10) Patent No.: US 10,597,556 B2
(45) Date of Patent: Mar. 24, 2020

(54) CROSSLINKABLE COMPOSITION CROSS-LINKABLE BY REAL MICHAEL ADDITION REACTION AND RESINS FOR USE IN SAID COMPOSITION

(71) Applicant: Allnex Netherlands B.V., Bergen op Zoom (NL)

(72) Inventors: Richard Hendrikus Gerrit Brinkhuis, Zwolle (NL); Antonius Johannes Wilhelmus Buser, Wehl (NL); Petrus Johannes Maria David Elfrink, Boxmeer (NL); Ferry Ludovicus Thys, Stevens-Woluwe (BE); Nicole Mangnus-Verhagen, Vogelwaarde (NL); Elwin Aloysius Cornelius Adrianus De Wolf, Hoogerheide (NL)

(73) Assignee: Allnex Netherlands B.V., Bergen op Zoom ( * ) Notice: Subject to any disclaimer, the term of this patent is extended or adjusted under 35 U.S.C. 154(b) by 0 days.

(21) Appl. No.: 15/889,291

(22) Filed: Feb. 6, 2018

(65) Prior Publication Data
US 2018/0155573 A1    Jun. 7, 2018

Related U.S. Application Data

(60) Division of application No. 14/246,229, filed on Apr. 7, 2014, now abandoned, which is a continuation of
(Continued)

(30) Foreign Application Priority Data

Oct. 7, 2011    (EP) .................................... 11184439

(51) Int. Cl.
*C08G 63/12*    (2006.01)
*C09D 167/00*    (2006.01)
(Continued)

(52) U.S. Cl.
CPC ........ *C09D 167/00* (2013.01); *B01J 31/0205* (2013.01); *B01J 31/0239* (2013.01);
(Continued)

(58) Field of Classification Search
None
See application file for complete search history.

(56) References Cited

U.S. PATENT DOCUMENTS

| | | | |
|---|---|---|---|
| 2,635,100 A | 4/1953 | Werntz | |
| 2,759,913 A | 8/1956 | Hulse et al. | |

(Continued)

FOREIGN PATENT DOCUMENTS

| | | | |
|---|---|---|---|
| CN | 86101015 A | 8/1986 | |
| CN | 1309683 A | 8/2001 | |

(Continued)

OTHER PUBLICATIONS

T. Jung et al.—Farbe und Lacke Oct. 2003.
(Continued)

*Primary Examiner* — Richard A Huhn
(74) *Attorney, Agent, or Firm* — Hoyng Rokh Monegier LLP; Ramin Amirsehhi

(57) ABSTRACT

An RMA crosslinkable composition having at least one crosslinkable component including reactive components A and B each including at least 2 reactive groups, the at least 2 reactive groups of component A being acidic protons (C—H) in activated methylene or methine groups and the at least 2 reactive groups of component B are activated unsaturated groups (C=C) and a base catalyst (C) which reactive components A and B crosslink by Real Michael Addition (RMA) reaction under action of the base catalyst, characterised in that the at least one crosslinkable component including reactive components A and B in the composition have a total hydroxy number of less than 60, preferably less (Continued)

than 40 and more preferably less than 20 mg KOH/g solids. Further, specific resins A and B having a low hydroxy number for use in RMA cross-linkable compositions and a process for the manufacture thereof.

13 Claims, 1 Drawing Sheet

Related U.S. Application Data application No. PCT/EP2012/069904, filed on Oct. 8, 2012.

(51) Int. Cl.
    *B01J 31/02*     (2006.01)
    *C08K 3/01*     (2018.01)
    *C08J 3/24*     (2006.01)
    *C08K 5/00*     (2006.01)
    *C09D 175/06*     (2006.01)
    *C08K 5/21*     (2006.01)
    *C09D 133/14*     (2006.01)

(52) U.S. Cl.
    CPC .............. *B01J 31/0268* (2013.01); *C08J 3/24* (2013.01); *C08K 3/01* (2018.01); *C08K 5/0008* (2013.01); *C08K 5/21* (2013.01); *C09D 133/14* (2013.01); *C09D 175/06* (2013.01); *B01J 2231/341* (2013.01); *C08G 63/12* (2013.01); *C08J 2367/00* (2013.01); *C08J 2369/00* (2013.01); *C08J 2375/04* (2013.01)

(56) References Cited

U.S. PATENT DOCUMENTS

| | | | |
|---|---|---|---|
| 4,217,396 A | 8/1980 | Heckles | |
| 4,223,072 A | 9/1980 | Baney et al. | |
| 4,408,018 A | 10/1983 | Bartman et al. | |
| 4,529,487 A | 7/1985 | Hsu et al. | |
| 4,602,061 A * | 7/1986 | Akkerman | C08F 283/00 525/10 |
| 4,749,728 A | 6/1988 | Craun et al. | |
| 4,851,294 A | 7/1989 | Buter et al. | |
| 4,871,822 A | 10/1989 | Brindöpke et al. | |
| 4,938,980 A | 7/1990 | Arciszewski et al. | |
| 5,017,649 A | 5/1991 | Clemens | |
| 5,084,536 A | 1/1992 | Brindöpke et al. | |
| 5,959,028 A * | 9/1999 | Irie | C08G 61/04 525/10 |
| 5,973,082 A | 10/1999 | Elmore | |
| 5,990,224 A | 11/1999 | Raynolds et al. | |
| 6,201,048 B1 | 3/2001 | Raynolds et al. | |
| 6,262,169 B1 | 7/2001 | Helmer et al. | |
| 6,265,029 B1 | 7/2001 | Lewis | |
| 6,706,414 B1 | 3/2004 | Dammann et al. | |
| 6,878,845 B2 | 4/2005 | Sheridan | |
| 6,989,459 B2 | 1/2006 | Walker | |
| 7,524,435 B2 | 4/2009 | Bernhard | |
| 7,851,530 B2 | 12/2010 | Brinkhuis et al. | |
| 8,013,068 B2 | 9/2011 | Beckley et al. | |
| 8,124,688 B2 | 2/2012 | Meijer et al. | |
| 8,569,440 B2 | 10/2013 | Spyrou et al. | |
| 8,829,151 B2 | 9/2014 | Meijer et al. | |
| 8,962,725 B2 | 2/2015 | Brinkhuis et al. | |
| 9,181,452 B2 | 11/2015 | Brinkhuis | |
| 9,181,453 B2 | 11/2015 | Brinkhuis | |
| 9,260,626 B2 | 2/2016 | Brinkhuis | |
| 9,284,423 B2 | 3/2016 | Brinkhuis | |
| 9,534,081 B2 | 1/2017 | Brinkhuis | |
| 9,587,138 B2 | 3/2017 | Brinkhuis et al. | |
| 9,834,701 B2 | 12/2017 | Brinkhuis et al. | |
| 2003/0023108 A1 | 1/2003 | Walker | |
| 2003/0195305 A1 | 10/2003 | Kuo et al. | |
| 2004/0072979 A1 | 4/2004 | Sheridan et al. | |
| 2005/0137275 A1 | 6/2005 | Nefzger et al. | |
| 2005/0143575 A1 | 6/2005 | Bernard | |
| 2006/0078742 A1 | 4/2006 | Kauffman et al. | |
| 2009/0143528 A1 | 6/2009 | Mestach et al. | |
| 2009/0226729 A1 | 9/2009 | Niimoto et al. | |
| 2011/0003937 A1 | 1/2011 | Kontani | |
| 2011/0251338 A1 | 10/2011 | Kim et al. | |
| 2013/0053505 A1 | 2/2013 | Brinkhuis et al. | |
| 2013/0210986 A1 | 8/2013 | Brinkhuis et al. | |
| 2013/0317156 A1 | 11/2013 | Yu | |
| 2014/0088233 A1 | 3/2014 | Kann | |
| 2014/0221542 A1 | 8/2014 | Brinkhuis et al. | |
| 2014/0228507 A1 | 8/2014 | Brinkhuis et al. | |
| 2016/0115344 A1 | 4/2016 | Brinkhuis et al. | |

FOREIGN PATENT DOCUMENTS

| | | |
|---|---|---|
| CN | 1637031 A | 7/2005 |
| CN | 1723242 A | 1/2006 |
| CN | 1757656 A | 4/2006 |
| CN | 1816597 A | 8/2006 |
| CN | 1910234 A | 2/2007 |
| CN | 1964997 A | 5/2007 |
| CN | 1976972 A | 6/2007 |
| CN | 101012291 A | 7/2007 |
| CN | 101103060 A | 1/2008 |
| CN | 101107289 A | 1/2008 |
| CN | 101213230 A | 7/2008 |
| CN | 101268149 A | 9/2008 |
| CN | 101869844 A | 10/2010 |
| CN | 101879457 A | 11/2010 |
| CN | 102834436 A | 12/2012 |
| CN | 102834437 A | 12/2012 |
| CN | 103562328 A | 2/2014 |
| CN | 103974999 A | 8/2014 |
| DE | 835809 A | 4/1952 |
| DE | 3041223 A1 | 5/1981 |
| EP | 0192304 A1 | 8/1986 |
| EP | 0198519 A1 | 10/1986 |
| EP | 0227454 A2 | 7/1987 |
| EP | 0161697 B1 | 3/1988 |
| EP | 0310011 A1 | 9/1988 |
| EP | 0326723 A1 | 8/1989 |
| EP | 0448154 A1 | 9/1991 |
| EP | 0501223 A2 | 9/1992 |
| EP | 0651023 A2 | 5/1995 |
| EP | 0808860 A2 | 11/1997 |
| EP | 1541606 A1 | 12/2004 |
| EP | 1593727 A1 | 11/2005 |
| EP | 1761582 | 1/2006 |
| EP | 1513900 B1 | 2/2006 |
| EP | 1838747 | 7/2006 |
| EP | 2072520 A1 | 6/2009 |
| EP | 1813630 B1 | 3/2010 |
| EP | 2374836 A1 | 4/2010 |
| EP | 1641887 B1 | 10/2010 |
| EP | 1902081 B1 | 12/2010 |
| EP | 2374836 A1 | 10/2011 |
| EP | 1641888 B1 | 2/2012 |
| EP | 2556108 B1 | 7/2014 |
| EP | 2764035 A1 | 8/2014 |
| EP | 3085748 A1 | 10/2016 |
| GB | 1596638 A | 8/1981 |
| GB | 2093472 A | 9/1982 |
| GB | 2010879 A | 7/1997 |
| GB | 2405149 A | 2/2005 |
| JP | 01204919 A | 8/1989 |
| JP | H1045993 A | 2/1998 |
| JP | 10330690 A | 12/1998 |
| JP | 2001516787 A | 10/2001 |
| JP | 2001516789 A | 10/2001 |
| JP | 2002514673 A | 5/2002 |
| JP | 2002285100 | 10/2002 |
| JP | 2003522817 A | 7/2003 |
| JP | 2004018859 A | 1/2004 |
| JP | 2004211090 A | 7/2004 |
| JP | 2013528670 A | 7/2013 |
| JP | 2014533948 A | 12/2014 |

(56) References Cited

FOREIGN PATENT DOCUMENTS

| | | |
|---|---|---|
| JP | 5910952 B2 | 4/2016 |
| KR | 100232793 B1 | 12/1999 |
| NL | 8203502 A | 4/1984 |
| RU | 2275403 C2 | 4/2006 |
| RU | 2346016 C2 | 2/2009 |
| RU | 2415167 C2 | 3/2011 |
| RU | 2484113 C2 | 6/2013 |
| RU | 2532909 C2 | 11/2014 |
| SG | 11201401321 W | 4/2013 |
| TW | 200613500 A | 5/2006 |
| WO | 9641833 A1 | 12/1996 |
| WO | 9914275 A1 | 3/1999 |
| WO | 9914278 A1 | 3/1999 |
| WO | 9914279 A1 | 3/1999 |
| WO | 9958608 A1 | 11/1999 |
| WO | 0004106 A1 | 1/2000 |
| WO | 0112708 A1 | 2/2001 |
| WO | 02053613 A1 | 7/2002 |
| WO | 03089479 A2 | 10/2003 |
| WO | 2004035632 A2 | 4/2004 |
| WO | 2005048866 A2 | 6/2005 |
| WO | 2005104694 A2 | 11/2005 |
| WO | 2006003044 A1 | 1/2006 |
| WO | 2006074895 A1 | 7/2006 |
| WO | 2006075000 A1 | 7/2006 |
| WO | 2006081079 A1 | 8/2006 |
| WO | 2007000335 A1 | 1/2007 |
| WO | 2007002328 A1 | 1/2007 |
| WO | 2007035255 A1 | 3/2007 |
| WO | 2008070022 A1 | 6/2008 |
| WO | 2008157468 A1 | 12/2008 |
| WO | 2011124663 A1 | 10/2011 |
| WO | 2011124664 A1 | 10/2011 |
| WO | 2011124665 A1 | 10/2011 |
| WO | 2012175622 A1 | 12/2012 |
| WO | 2013050574 A1 | 4/2013 |
| WO | 2013050622 A1 | 4/2013 |
| WO | 2013050623 A1 | 4/2013 |
| WO | 2013071012 A2 | 5/2013 |
| WO | 2005021672 A1 | 10/2014 |
| WO | 2014166880 A1 | 10/2014 |
| WO | 2016166334 A1 | 10/2016 |
| WO | 2016166361 A1 | 10/2016 |
| WO | 2016166365 A1 | 10/2016 |
| WO | 2016166369 A1 | 10/2016 |
| WO | 2016166371 A1 | 10/2016 |
| WO | 2016166381 A1 | 10/2016 |
| WO | 2016166382 A1 | 10/2016 |

OTHER PUBLICATIONS

International Search Report of PCT/EP2012/069904.
Braun, D. et al., Polymer Synthesis: Theory and Practice, 4th ed., 2005, pp. 64-66.
Noomen, Arie: "Applications of Michael addition chemistry in coatings technology", Progress in Organic Coatings, 32 (1997), pp. 137-142.
Krishnadas, Shashikiran et al., "Rapid Setting Epoxy Primer System with the Addition of Blocked Catalyst", Indian Journal of Advances in Chemical Science 2 (2014), pp. 55-60.
Lösungen, Römpp online 4.0, Mar. 1, 2002.
"The Basics of Airless Spraying, Information on Basic Components, Spray Techniques and Safety", 2014.
"ETPPAAc Solutions Ethyltriphenylphosphonium Acid Acetate", Apr. 20, 2007, pp. 1-2.
Brinkhuis, R.; Schutyser, J.; Thys, F.; De Wolf, E.; Buser, T.; Kalis, J.; Magnus, N.; Van Wijk, F. Taming the Michael Addition Reaction. European Coatings Journal 2015, 34-40. (Year: 2015).

* cited by examiner

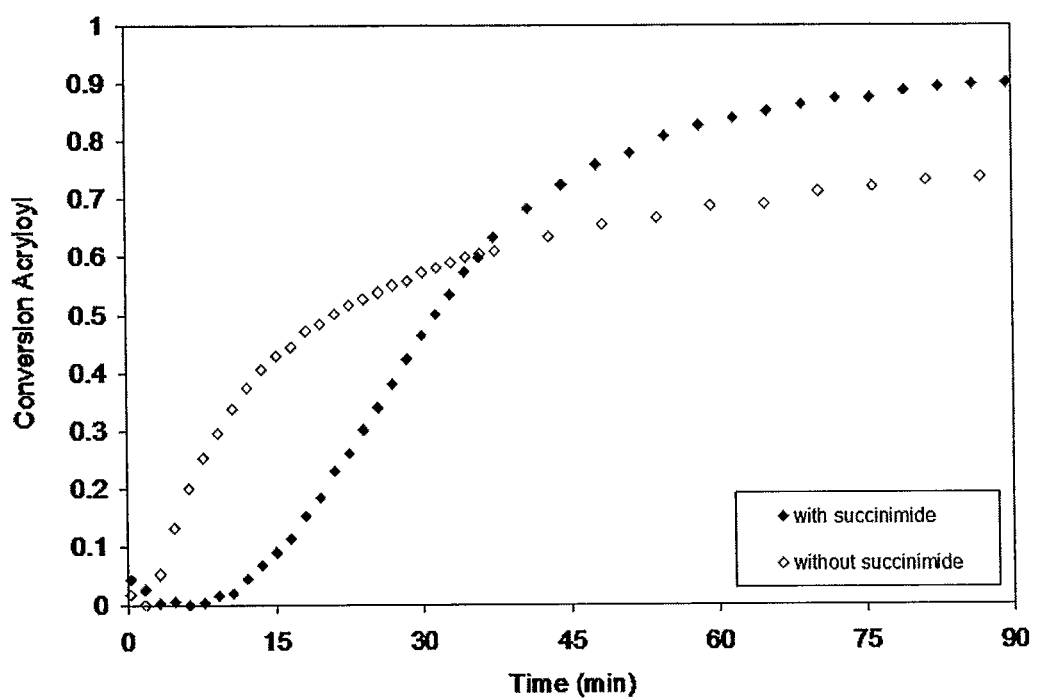

CROSSLINKABLE COMPOSITION CROSS-LINKABLE BY REAL MICHAEL ADDITION REACTION AND RESINS FOR USE IN SAID COMPOSITION

CROSS REFERENCE TO RELATED APPLICATIONS

This application is a divisional of U.S. patent application Ser. No. 14/246,229 filed on 7 Apr. 2014 which is a continuation of PCT application number PCT/EP2012/069904 filed on 8 Oct. 2012, which claims priority from European application number 11184439.5 filed on 7 Oct. 2011. All applications are hereby incorporated by reference in their entireties.

BACKGROUND OF THE INVENTION

1. Field of the Invention

The present invention relates to a crosslinkable composition cross-linkable by real Michael addition (RMA) reaction and resins for use in said composition. Real Michael Addition is a reaction wherein a reactive component B with at least 2 activated unsaturated groups (hereafter also referred to as the RMA acceptor) and a reactive component A with at least 2 acidic protons C—H in activated methylene or methine groups (hereafter also referred to as the RMA donor) react in the presence of a strong base catalyst.

2. Description of the Related Art

RMA chemistry can be tuned to give very fast curing compositions (also at lower curing temperatures) in coating compositions at acceptable or good pot lives and good material properties, which makes this chemistry very attractive as a basis for coating compositions. Details of RMA cross-linkable compositions using a latent based cross-linking catalyst are described by inventors of the present application in WO2011/055463 which is herewith incorporated by reference.

Real Michael addition is activated by strong bases. In tuning the reactivity of coating systems in view of achieving a desirable drying profile, there are various requirements to balance. The drying profile (also referred to as the reaction profile or as the curing profile) is the progress of the cross-linking reaction as a function of time. It is required that the drying profile allows build-up of mechanical properties as fast as possible, to help the productivity of the coater. There is also a desire for crosslinkable compositions that can be simply cured in ambient conditions, as opposed to for example compositions comprising photo-latent amine catalysts, known from T. Jung et al Farbe and Lacke October 2003.

On the other hand, it is required to have a good appearance of the resulting coating. This implies the need for sufficient levelling during the immediate period after application, when the curing coating composition is present as a liquid and capable of such levelling. This also implies the need for absence of artefacts like solvent inclusions or gas inclusions or other surface irregularities that may occur if curing is very fast, especially if it is faster at the surface than in deeper layers, which is often the case if curing occurs at the time scale of solvent evaporation or surface activation of a catalyst. Also, film hardness build-up will be affected under conditions in which solvent entrapment occurs. The described requirements are to some extent opposing each other. For a fast curing profile high levels of catalyst are preferred, whereas at the same time such high levels of catalysts may negatively influence surface appearance and hardness development.

BRIEF SUMMARY OF THE INVENTION

The object of the invention is to provide improved crosslinkable compositions that provide optimum coating properties in the delicate balance of these apparently counteracting requirements, in particular in crosslinkable compositions having a high solid content. In particular, there is a continuous desire to improve the appearance and hardness of the coatings and the problem is to provide RMA cross-linkable compositions that result in coatings having improved appearance and hardness.

BRIEF DESCRIPTION OF THE DRAWINGS

FIG. 1 illustrates the conversion of the acryloyl (as followed by FTIR at 809 $cm^{-1}$) in the preferred acryloyl/malonate system using succinimid as component D.

DESCRIPTION OF ILLUSTRATIVE EMBODIMENTS

The following is a description of certain embodiments of the invention, given by way of example only and with reference to the FIGURE.

According to the invention there is provided an RMA crosslinkable composition comprising at least one crosslinkable component comprising reactive components A and B, each comprising at least 2 reactive groups wherein the at least 2 reactive groups of component A are acidic protons (C—H) in activated methylene or methine groups and the at least 2 reactive groups of component B are activated unsaturated groups (C=C) and a base catalyst (C) which reactive components A and B crosslink by Real Michael Addition (RMA) reaction under action of the base catalyst, characterised in that the at least one crosslinkable component comprising reactive components A and B in the composition have a total hydroxy number of less than 60, preferably less than 40 and more preferably less than 20 mg KOH/g solids. It was surprisingly found that cross-linkable compositions comprising the special cross-linkable components with very low hydroxy number show significantly improved hardness and improved appearance as is exemplified in the examples.

In a preferred embodiment the crosslinkable composition the catalyst C is a carbonate salt according to formula X+ROCO2−, wherein X+ is a non-acidic cation, preferably quaternary ammonium or phosphonium, and R is hydrogen or a substituted or unsubstituted alkyl, aryl, or aralkyl group. Details of this latent base catalyst are described in WO2011/055463, which is herewith incorporated by reference.

The reactive components A and B can be in the form of separate molecules and each independently in the form of polymers, oligomers, dimers or monomers. Therefore, a "cross-linkable component comprising the active component A" is sometimes also referred to herein as component A. Reactive components A and B can be combined in a single molecule. Optionally, even catalyst C can be combined in a single molecule with reactive component A and/or B. It is preferred that the cross-linkable composition comprises an oligomeric or polymeric resin A comprising reactive components A. The invention also relates to oligomeric or polymeric resin A comprising reactive components A having a hydroxy number of less than 60, preferably less than 40, more preferably less than 20 and optionally even less than 10 mg KOH/g solids.

The invention further relates to oligomeric or polymeric resin B comprising reactive components B and having a hydroxy number of less than 60, preferably less than 40 and more preferably less than 20 mg KOH/g solids. The invention further relates to the use of resin A or resin B or mixtures of resin A and B for the preparation of RMA cross-linkable compositions.

Component A

Suitable examples of components A containing activated methylene or methine groups are well known in the art. Preferred are the oligomeric and/or polymeric components such as, for example, polyesters, polyurethanes, polyacrylates, epoxy resins, polyamides and polyvinyl resins containing reactive component A in the main chain, pendant or both. Preferably, the polymer is a polyester, polyurethane or polycarbonate.

The crosslinkable component comprising reactive components A preferably is a polymer comprising one or more reactive components A having a structure according to formula 2:

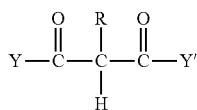

Formula 1 wherein R is hydrogen or an alkyl, aralkyl or aryl substituent and Y and Y' are same or different substituent groups, preferably alkyl, aralkyl or aryl (R*), alkoxy (—OR*) or a polymer backbone or wherein the —C(=O)—Y and/or —C(=O)—Y' is replaced by CN or phenyl and which polymer has a hydroxy number of less than 60, preferably less than 40 and more preferably less than 20 mg KOH/g solids. In case R is hydrogen, the CH2 is the activated methylene and in case R is not hydrogen, the C—H is the activated methine.

Good results can be obtained when the activated C—H group containing component A is malonate (in Y and Y' are —OR* in Formula 1) or acetoacetate (Y is —OR* and Y' is —R* in Formula 1). Preferably more than 50, preferably 60, 70, 80, 90 or 95% of the reactive components A in the crosslinkable component are malonate groups. Components containing both malonate and acetoacetate groups in the same molecule are also suitable. Additionally, physical mixtures of malonate and acetoacetate group-containing components are suitable. The cross-linkable component comprising reactive component A preferably is a polymer comprising an average of 2 to 20, preferably 4 to 10 active C—H functions per molecule.

In a most preferred embodiment of the crosslinkable composition, component A is a malonate containing compound. It is preferred that in the crosslinkable composition the majority of the activated C—H groups are from malonate, that is more than 50%, preferably more than 60%, more preferably more than 70%, most preferably more than 80% of all activated C—H groups in the crosslinkable composition are from malonate. In another embodiment, the crosslinking composition comprises a component A, for example a polymer, wherein more than 50%, preferably more than 70%, more preferably more than 80% and most preferably more than 90% of the activated C—H groups are from malonate and a separate component, for example another polymer, oligomer or monomer, comprising activated C—H groups not from malonate, for example acetoacetate.

Especially preferred malonate group-containing components for use with the present invention are the malonate group-containing oligomeric or polymeric esters, ethers, urethanes and epoxy esters containing 1-50, more preferably 2-10, malonate groups per molecule. practice polyesters and polyurethanes are preferred. It is also preferred that such malonate group-containing components have a number average molecular weight (Mn) in the range of from about 100 to about 5000, more preferably, 250-2500, and an acid number of about 2 or less. Also monomalonates can be used as they have 2 reactive per molecule. Monomeric malonates can, in addition, be used as reactive diluents.

The invention also relates to a polymeric or oligomeric resin A, for use in a RMA cross-linkable composition, comprising one or more reactive components A having a structure according to formula 2:

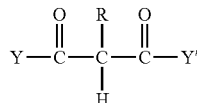

Formula 1 wherein R is hydrogen or an alkyl, aralkyl or aryl substituent and Y and Y' are same or different substituent groups, preferably alkyl, aralkyl or aryl (R*), alkoxy (—OR*) or a polymer backbone or wherein the —C(=O)—Y and/or —C(=O)—Y' is replaced by CN or phenyl and which polymeric or oligomeric resin A has a hydroxy number of less than 60, preferably less than 40 and more preferably less than 20 mg KOH/g solids. Preferably, the polymeric or oligomeric resin is a polyester, polyether, polyepoxy, polyurethane or polycarbonate, more preferably a polyether, polyester or polyurethane, comprising reactive components A, preferably malonate or acetoacetate and preferably in an amount that the resin comprises an average of 2 to 20, preferably 4 to 10 active C—H functions per molecule. Preferably, more than 50, preferably 60, 70, 80, 90 or 95% of the reactive components A in the crosslinkable component are malonate groups. Malonate containing resin A is preferred over for example acetoacetate containing resin A because it provides improved pot life and coating hardness.

The resin A typically has a number molecular weight between 100-20000 gr/mol, preferably between 250 and 10000 and in view of the rheology of the coating composition and the mechanical properties of the obtained coating more preferably between 300 and 6000 gr/mol and preferably an equivalent weight per reactive component A of 100-2000 gr/mol. The resin acid number this preferably less than 4, preferably less than 3, 2 or 1 mg KOH/gr because a high acid number would result in inactivation of at least a part of the base catalyst.

Component B

Components B generally can be ethylenically unsaturated components in which the carbon-carbon double bond is activated by an electron-withdrawing group, e.g. a carbonyl group in the alpha-position. Suitable components B are known in the art, for example acryloyl esters, acrylamides, alternatively polyesters based upon maleic, fumaric and/or itaconic acid (and maleic and itaconic anhydride and polyesters, polyurethanes, polyethers and/or alkyd resins containing pendant activated unsaturated groups. Acrylates, fumarates and maleates are preferred. Most preferably, the component B is an unsaturated acryloyl functional component.

It is also especially preferred that the acid number of the activated unsaturated group-containing components (as of any of other component used in the composition) is sufficiently low to not substantially impair activity of the catalyst, so preferably less than about 2, most preferably less than 1 mg KOH/g. As exemplified by the previously incorporated references, these and other activated unsaturated group-containing components, and their methods of production, are generally known to those skilled in the art, and need no further explanation here. Preferably the functionality is 2-20, the equivalent weight (EQW: average molecular weight per reactive functional group) is 100-2000, and the number average molecular weight preferably is Mn 200-5000.

The advantages of the invention are particularly manifest in critically difficult compositions comprising not only a high solids content but also aimed at a high crosslinking density, with relative high concentrations and functionalities of functional groups, for example in case the component A is a compound, in particular an oligomer or polymer, comprising an average of 2 to 30, preferably 4 to 20 and more preferably 4-10 activate C—H per polymer chain.

Typically, the concentrations of the functional groups in components A and B, and their relative stoichiometry, are chosen such that good film properties following cure may be expected, with efficient use of these functional groups. Typically, stoichiometries C—H/C=C are chosen to be from 0.1 to 10, preferably 0.5 to 3, more preferably 0.7 to 3, most preferably 0.8/1.5.

The invention also relates to a polymeric or oligomeric resin B for use in a RMA cross-linkable composition comprising one or more reactive components B comprising activated unsaturated groups (C=C), preferably unsaturated acryloyl or maleate functional groups (preferably acryloyl) or an acrylamide and which polymeric or oligomeric resin has a hydroxy number of less than 60, preferably less than 40 and more preferably less than 20 mg KOH/g solids. The resin B preferably is a polyester, polyether, polyepoxy, polyurethane or polycarbonate comprising reactive component B and preferably has a number molecular weight between 300 and 20000 gr/mol, preferably between 300 and 10000 or 6000 gr/mol. The prior art commonly uses TMPTA which has a molecular weight of 296. The resin B preferably has a equivalent weight per reactive component A or B of 100-2000 gr/mol and an acid number less than 4, preferably less than 3, 2 or 1 mg KOH/gr.

The invention also relates to a resin mixture of polymeric or oligomeric resin A and polymeric or oligomeric resin B as described above for use in a RMA cross-linkable compositions and to the use use of resin A or resin B or of a resin mixture of resin A and resin B as cross-linkable components in an RMA cross-linkable composition. Herein it is preferred that at least one of resin A or resin B comprise at least 3 reactive cross-linking groups for forming a three-dimensional cross-linked network and at least one of resin A or resin B comprises at least two reactive cross-linking groups and wherein resin A or B or both have an average of 3-30 reactive cross-linking groups per polymer or oligomer molecule.

Process for the Preparation of the RMA Resins A and B According to the Invention.

The invention also relates to a process for the preparation of the RMA resins A and B according to the invention, in particular, to a process for the preparation of resin A comprising transesterification of a polyol with reactive component A in the form of an carboxylic acid ester (Y and Y' are alkoxy (—OR*)) and to a process for the preparation of resin B comprising transesterification of a polyol with reactive component B, preferably an acryloyl, in the form of carboxylic acid ester or by direct esterification of a polyol with reactive component B in the form of carboxylic acid.

What is particularly important is that in the preparation process of resin A or resin B the relative amounts of the components in the reaction mixture and the reaction time in combination with the reaction temperature are chosen such that the resulting resin A or B has the required low hydroxy number of less than 60, preferably less than 40 and more preferably less than 20 mg KOH/g solids. In reaction between a polyol and reactive component A, the hydroxy value will be high in the beginning of the reaction and will gradually decrease as hydroxy groups of the polyol react with reactive component A. The skilled person can calculate the required amounts of components such that the resulting resin A on completion of the reaction has a very low hydroxy value and can determine by known techniques, such as acid-base titration whether the resulting resin has reacted sufficiently long to reduce the hydroxy value to the required level to form resin A or B.

The polyester resin used in the present invention can be prepared by copolymerisation of one or more polyols, one or more polyacids, and one or more esters of malonic acid and/or etylacetoacetic acid. A preferred way of preparing the polyesters of present invention is to prepare in a first step a hydroxylfunctional polyester, and in later step transesterifying the polyester of the first step with esters of malonic or ethylacetoacetic acid and a volatile alcohol, preferably ethanol or methanol.

The hydroxyfunctional polyester can also be prepared by reacting a hydroxyl functional polyester polyol with chain extenders, preferably lactones such as caprolactone, valerolactone, and butyrolactone. Alternatively this hydroxypolyester can be prepared by reacting a polyester bearing both hydroxyl and acid groups with one or more mono or polyfunctional epoxy compounds. Suitable mono or polyfunctional epoxy compounds are mono-, di- or polyglycidyl ethers of (cyclo)aliphatic or aromatic hydroxyl compounds such as allyl alcohol, butanol, cyclohexanol, phenol, butyl phenol, decanol, ethylene glycol, glycerol, cyclohexane diol, mononuclear di- or trifunctional phenols, bisphenols such as Bisphenol-A or Bisphenol-F, and multinuclear phenols.

The polyols of the first step can also be prepared by reacting a hydroxy functional polyester of the first step with a mono- or polyfunctional isocyanate compound. As suitable at least trifunctional isocyanates may be mentioned a wide variety of monomeric and oligomeric polyfunctional isocyanates. The polycarboxylic acids for the preparation of the polyester polyol are preferably selected from the group of acyclic or cyclic polycarboxylic acids, the esters or the anhydrides thereof. Cyclic polycarboxylic acids include aromatic polycarboxylic acids and cycloaliphatic polycarboxylic acids. Included in this polycarboxylic acids are fatty acids, their esters, dimers and higher oligomers and mixtures thereof. Also included are the esters or the anhydrides thereof such as dimethyl ester and diethyl ester of malonic acid, succinic anhydride, octenyl succinic anhydride (any isomer or mixture of isomers of 4-octenyl-5-hydro-1,3furandione), dodecenyl succinic anhydride (any isomer or mixture of isomers of 4-dodecenyl-5-hydro-1,3-furandione), and mixtures thereof.

The optionally co-condensed monocarboxylic acids may be aliphatic, cycloaliphatic, aromatic or mixtures thereof.

Preferably, the monocarboxylic acid contains 6 to 18 carbon atoms, most preferably 7 to 14 carbon atoms, such as octanoic acid, 2-ethylhexanoic acid, isononanoic acid, decanoic acid, dodecanoic acid, benzoic acid, hexahydrobenzoic acid, and mixtures thereof. Preferably, the polyol is a cycloaliphatic or aliphatic polyol having 2 to 15 carbon atoms. Also preferred are mixtures of at least one polyol selected from trimethylol ethane, trimethylol propane, glycerol, pentaerythritol, and ditrimethylol propane with at least one diol having 2 to 15 carbon atoms. Preferred diols include 1,2ethane diol, 1,2-propane diol, 1,3-propane diol, 3-methyl-1,3-propane diol, 2butyl-2-ethyl-1,3-propane diol, dimethylol propionic acid, and 1,4-cyclohexane dimethanol. Examples of suitable monofunctional alcohols include alcohols with 6-18 carbon atoms such as 2-ethyl hexanol, dodecanol, cyclohexanol and trimethyl cyclohexanol. The optionally co-condensed monocarboxylic acids may be aliphatic, cycloaliphatic, aromatic or mixtures thereof. Preferably, the monocarboxylic acid contains 6 to 18 carbon atoms, most preferably 7 to 14 carbon atoms, such as octanoic acid, 2-ethylhexanoic acid, isononanoic acid, decanoic acid, dodecanoic acid, benzoic acid, hexahydrobenzoic acid, and mixtures thereof. Typical hydroxy acids that can be used include dimethylol propionic acid, hydroxypivalic acid, and hydroxystearic acid. Suitable monofunctional epoxy compounds include the glycidyl esters of branched Monocarboxylic acids such as Cardura® E from Resolution. Polyurethane, polyether polyols can be prepared in the known manner using suitable monomers as described above.

Preferably, in view of the desired mechanical and appearance properties of a coating prepared from the cross-linkable composition, the oligomer or polymer constituents of resin A are chosen such that the glass transition temperature of the resin A is between −25 and +25° C., more preferably between −20 and +20° C. and most preferably between −20 and +15° C. In combination with said resin A the glass transition temperature of resin B can be chosen between wider ranges, preferably between −50 and +25° C. The resins can be aliphatic or a mix of aliphatic and aromatic constituents with an aromatic constituents percentage chosen in view of the envisaged application. The amount of aromatic compounds in resin A and in resin B and also in a mixture of resin A and Resin B is preferably at most 60 wt % (relative to the total weight of the resin or resin mixture), preferably at most 40, 20 or 10 wt %. Good results were obtained in a preferred embodiment wherein resin A and resin B are aliphatic resins, i.e. comprising substantially no aromatic constituents (at most 5 wt %). In view of the RMA cross-linking the activity, the acid number of resin A and B is preferably less than 1 mg KOH/g solids. In view of the properties of the resulting coating and the reaction kinetics, the molecular weight is preferably low between 300 and 6000 gr/mol. In view of achieving a good drying and coating hardness, the hydroxy number is preferably as low as possible; most preferably less than 20 and optionally even less than 10 mg KOH/g solids. Even though the molecular weight is relatively low, in view of the mechanical properties of the resulting coating, the Resins must have sufficient cross-linking functionality. Preferably, resin A and resin B have an average functionality of 3-30 reactive cross-linking groups per polymer or oligomer molecule. For resin A the functionality is preferably between 5 and 30, more preferably between 10 and 30. Suitable combinations can be a mixture of resin A with relatively high functionality and resin B with a relatively low functionality, in particular resin A with functionality between 10 and 30 and resin B with a functionality of 3-20 or 3-10.

Component C

The base catalyst C can in principle be any known catalyst suitable for catalyzing RMA reactions. Preferably, in view of achieving good pot-life in combination with low temperature curing, the cross-linking composition comprises a catalyst system C comprising a strong based blocked by a volatile acid which is activated by evaporation of this acid. A suitable catalyst system C comprises a strong base blocked by a carbon dioxide, or the blocked catalytic species are of formula $ROCO_2-$, R being a optionally substituted alkyl, preferably C1-C4 radical or hydrogen, preferably the catalyst comprises a blocked base anion and a non-acidic cation, preferably a quaternary ammonium or phosphonium cation. Suitable catalyst C is described in WO2011/055463 herewith incorporated by reference. It is preferred that the crosslinking catalyst is utilized in an amount ranging between 0.001 and 0.3 meq/g solids, preferably between 0.01 and 0.2 meq/g solids, more preferably between 0.02 and 0.1 meq/g solids (meq/g solids defined as mmoles base relative to the total dry weight of the crosslinkable composition, not counting particulate fillers or pigments). Alternatively, the catalyst system C is activated by reaction of an epoxy component with a tertiary amine, or an anion.

For the $CO_2$ deblocking catalyst systems, it was surprisingly found that significantly better pot life could be achieved in a composition wherein component A is a malonate, which composition further comprises 0.1-10 wt %, preferably 0.1-5, more preferably 0.2-3 and most preferably 0.5-2 wt % water (relative to total weight of the coating composition). Preferably, the amount of water is chosen in an effective amount to increase gel time with at least 15 minutes, preferably at least 30 min, more preferably at least 1 h, even more preferably at least 5 h, and most preferably at least 24 h, 48 h. or at least 10%, 50% or 100% compared to the same composition without water.

Component D

The cross-linkable composition may comprise as an additive to improve appearance and or hardness of the coating an X—H group containing component (D) that is also a Michael addition donor reactable with component B under the action of catalyst C, wherein X is C, N, P, O or S, preferably C, N or P, preferably present in quantities of at least 50 mole % relative to base generated by component C, and less than 30 mole % of C—H active groups from component A.

Component D as described in an catalysed RMA cross-linkable composition can create a reactivity profile comprising an initial induction time of lowered reaction rate directly after application and activation of the system, followed by a relative increase of reactivity in later stages. This induction time can be tuned, to allow a "open time" the period allowing flow and solvent and entrapped air bubbles to escape. The induction time allows a significantly higher amount of flow and levelling of the system, avoiding surface defects that may result from very fast cure without these additives, and better hardness build-up due to reduced solvent entrapment, while still benefiting from the full potential of the catalysts beyond this induction time, thus creating an acceleration of the reaction at later stages to complete crosslinking at higher rate than would be found if simply using lower catalyst levels. Also the high sensitivity of lower catalyst levels towards accidentally present acid contaminations is avoided.

Although the advantages of the invention are apparent in layers of normal thickness, the crosslinkable composition according to the invention is particularly suitable for making thick layers. Thick layers are considered to be layers having a cured dry thickness of at least 50 or more than 70 micrometers. In thick layer applications the risk of air and solvent inclusions is higher. This is particularly pronounced in RMA crosslinkable compositions that are cured at low temperature in the range from 10 to 60° C. where resins are more viscous and levelling is difficult.

The X—H group in component D has a higher acidity than the C—H groups in component A, preferably being characterized in that component D has a pKa (defined in aqueous environment) of at least one unit, preferably two units, less than that of component A. Preferably the pKa of the X—H group in component D is lower than 13, preferable lower than 12, more preferably lower than 11 most preferably lower than 10. An excessive acidity may create problems with components in the catalyst system; therefore hence the pKa is preferably higher than 7, more preferably higher than 7.5 and optionally higher than 8. The acidity difference assures that on application of the coating, component D is activated (deprotonated) preferentially over component A.

Preferably component D is selected from one or more compounds from the group of Compounds D1 comprising C—H acidic protons (X is C) in activated methylene or methine groups and Compounds D2 comprising N—H acidic compound (X is N). Suitable components D2 are an aza-acidic compounds (X is N) preferably comprising a molecule containing the N—H as part of a group Ar—NH—(C=O)—, —(C=O)—NH—(C=O)—, or of a group —NH—(O=S=O)— or a heterocycle in which the nitrogen of the N—H group is contained in a heterocyclic ring, more preferably component D2 is an imide derivative, preferably an (optionally substituted) succinimide or glutarimide. Other suitable components D2 are hydantoin derivatives, for example 5,5-dimethylhydrantoin, sulfonamides, for example aromatic sulfonamides as benzene- or toluenesulfonamide or heterocyclic compounds, for example triazoles or a pyrazoles, or a uracil derivative.

In the crosslinkable composition, the X—H groups in component D are present in an amount corresponding to at least 50 mole %, preferable at least 100 mole %, most preferably at least 150 mole % relative to the amount of base to be generated by catalyst C. The appropriate amount is very much determined by the acid base characteristics of component D relative to component A, and the reactivity of the corresponding anions relative to B, so may vary for different systems. It is noted that the open time improving effect can in some cases be obtained at very small amounts of component D, which is very advantageous because such small amounts do not or not significantly affect the properties of the resulting cured composition; for example the chemical and mechanical properties of a coating. Typically the X—H groups in component D are present in an amount corresponding to no more than 30 mole %, preferably no more than 20, optionally no more than 10 mole % relative to C—H donor groups from component A. Preferably, the functionality (number of groups per molecule) of component D is low, preferably less than 4, more preferably less than 2, most preferably it is 1.

The crosslinkable composition may comprise next to one or more different components D a component D1 comprising acidic protons (C—H) in activated methylene or methine groups having a higher acidity than component B and which are also is reactive towards component A. Such component D1 can also contribute to the open time improving effect, however in order to have a significant effect D1 should be typically be present in an amount between 10-40 mol % (relative to total RMA C—H), which is a significantly higher amount than for component D.

The difference in acidity of the two C—H acidic components A and D1 is chosen preferably in that wherein the pKa of component D1 is between 0.5 and 6, preferably between 1 and 5 and more preferably between 1.5 and 4 units lower than the pKa of component A. Preferably, component A is a malonate containing component and component D1 is an acetoacetate or acetylacetone containing component, preferably of low C—H functionality (preferably less than 10, more preferably less than 5, most preferably it is no more than 2. Suitable components D and A2 are listed below with the pKa value.

| | |
|---|---|
| succinimide | 9.5 |
| ethosuximide | 9.3 |
| 5,5-dimethylhydantoin | 10.2 |
| 1,2,4-triazole | 10.2 |
| 1,2,3-triazole | 9.4 |
| benzotriazole | 8.2 |
| benzenesulfonamide | 10.1 |
| nitromethane | 10.2 |
| isatine | 10.3 |
| uracil | 9.9 |
| 4-nitro-2-methylimidazole | 9.6 |
| phenol | 10.0 |
| ethylacetoacetate | 10.7 |
| acetylacetone | 9.0 |
| diethylmalonate | 13.0 |

The invention also relates to the use of the component D as described above as an additive to RMA cross-linkable compositions. The advantages of improved appearance and improved hardness can be obtained irrespective of the thickness of the layer but are particularly apparent in thick coating layers having a dry thickness of at least 50, preferably at least 60, 75, 100 and more preferably at least 125 micrometer, for the improvement of the open time of the crosslinkable composition and for the improvement of the appearance and hardness of the resulting cured composition, in particular a coating.

In the crosslinkable composition the nature and amount of component D is chosen to yield, under the application and curing conditions chosen, an increase in time to get to a 30% conversion level, of at least 3, preferably 5, more preferably 10 minutes, preferably less than 60, more preferably less than 30 minutes, when compared to the same composition without component D.

Solvent Component

The cross-linkable composition can be used without having any additional solvent. This would typically be the case when the cross-linkable components in the composition have sufficient low viscosity and all components together form a solution. A solvent may be added for example to reduce the viscosity in case of high solids content of relatively high viscosity components, to mediate the reaction kinetics or in case the composition contains certain additives that would require the solvent. The solvent can be water or can be an organic solvent or mixtures thereof. Most preferred is to use an organic solvent. The organic solvent may contain (substantially) no water. However, it is sometimes preferred in view of increasing pot life to add in addition to organic solvent also a relatively small amount of water, preferably between 0.1 and 10 wt % (relative to the total weight of the cross-linkable composition).

For CO2 deblocking catalyst systems, the inventors further found that advantages can be achieved in pot life if in the crosslinkable composition at least part of the solvent is a primary alcohol solvent. The solvent can be a mixture of a non-alcoholic solvent and an alcohol solvent. Preferably, the alcohol is present in an amount of at least 1, preferably 2, more preferably 3, most preferably at least 5, even more preferably at least 10 wt % relative to the total weight of the crosslinkable composition and in view of VOC constraints preferably at most 45, preferably at most 40 wt %, most preferably less than 30 wt %.

The alcohol solvent preferably is one or more primary alcohols, more preferably a mono-alcohol having 1 to 20, preferably 1-10, more preferably 1-6 carbon atoms, preferably selected from the group of ethanol, n-propanol, n-butanol, n-amyl alcohol and butylglycol In summary, the crosslinkable composition according to the invention comprises
   a. between 5 and 95 wt % of a resin A having reactive components A comprising at least 2 acidic protons C—H in activated methylene or methine, said resin A having a hydroxy number of less than 60, preferably less than 40 and more preferably less than 20 mg KOH/g solids, and
   b. between 5 and 95 wt % of a resin B having reactive components B with at least 2 activated unsaturated groups (wt % relative to the total weight of the crosslinkable composition) said resin B having a hydroxy number of less than 60, preferably less than 40 and more preferably less than 20 mg KOH/g, solids and
   c. a catalyst system C that contains, or is able to generate a basic catalyst capable of activating the RMA reaction between components A and B, preferably at levels of 0.0001 and 0.5 meq/g solid components,
   d. optionally an X—H group containing component (D) that is also a Michael addition donor reactable with component B under the action of catalyst C, wherein X is C, N, P, O or S, preferably C, N or P, preferably present in quantities of at least 50 mole % relative to base generated by component C, and less than 30 mole % of C—H active groups from component A,
   e. optionally between 0.1 and 80 wt % of solvent, preferably an organic solvent which preferably contains at least 1 wt % of a primary alcohol and optionally at least 0.1-10 wt % water
   wherein the sum of the above-mentioned components is 100 weight percent and wherein the resins A and B in the composition have a total hydroxy number of less than 60, preferably less than 40 and more preferably less than 20 mg KOH/g solids.

Considering that the crosslinkable composition is a 2K composition which is only formed shortly before the actual use, the invention also relates to a kit of parts for the manufacture of the composition according to the invention comprising a part 1 comprising components A and B but not C and part 2 comprising component C. A kit of parts for the manufacture of the composition according to the invention comprises a part 1 comprising the cross-linkable components comprising reactive components A and/or B but no C and part 2 comprising component C The invention also relates to the use of the crosslinking composition according to the invention in a method for the manufacture of coating compositions, films or inks and to coating compositions, inks or films comprising the crosslinking composition according to the invention and further application oriented additives for example one or more coating additives like pigments, co-binder, solvents etc.

The invention also relates to a process for making a coating layer having a fully cured dry thickness of at least 70, 75, 80 or 100 and more preferably at least 125 micrometer and having a good surface appearance and hardness of the resulting cured composition comprising mixing the components A, B with catalyst C shortly before use to form a coating composition according to the invention, applying a layer of the coating composition on a substrate and allowing the curing thereof at temperature between 0 and 60° C.

The foregoing more general discussion of the present invention will be further illustrated by the following specific examples, which are exemplary only.

Molecular weights were measured by GPC in THF, and expressed in polystyrene equivalent weights.

Persoz hardness measurement: Persoz pendulum hardness was measured in a climatized room at 23° C., and 55+/−5% relative humidity. Hardness is measured with a pendulum acc. Persoz as described in ASTM D 4366.

Drying time was determined by firmly pressing the thumb in the paint film. The time was recorded when there was no visible trace left in the paint film.

Resin Example According to the Invention: Preparation of Malonate Polyester Resin I Into a reactor provided with a distilling column filed with Raschig rings were brought 4.691 moles of neopentyl glycol, 2.173 moles of hexahydrophthalic anhydride and 0.0012 moles of butyl stannoic acid. The mixture was polymerised at 240° C. under nitrogen to an acid number of 0.2 mg KOH/g. The mixture was cooled down to 130° C. and 2.819 moles of diethylmalonate were added. The reaction mixture was heated to 170° C. and ethanol was removed under reduced pressure. The nearly colourless material was cooled down and diluted with 178 g of butyl acetate to a 85% solid content. The final resin had an acid number of 0.3 mg KOH/g solids, an OH value of 8 mg KOH/g solids. The resin was diluted to 85% solids with butyl acetate.

Resin Example According to the Invention: Preparation of Malonate Polyester Resin II In a similar way as under (I) were brought 4.521 moles of neopentyl glycol, 2.095 moles of hexahydrophthalic anhydride, 0.232 moles of Butyl ethyl propane diol and 0.0011 moles of butyl stannoic acid were brought in a reactor. The mixture was polymerised at 240° C. under nitrogen to an acid number of 0.2 mg KOH/g. The mixture was cooled down to 130° C. and 2.717 moles of diethylmalonate were added. The reaction mixture was heated to 170° C. and ethanol was removed under reduced pressure. The nearly colourless material was cooled down and diluted with 178 g of butyl acetate to a 85% solid content. The final resin had an acid number of 0.3 mg KOH/g solids, an OH value of about 30 mg KOH/g solids. The resin was diluted to 85% solids with butyl acetate.

Comparative Resin Example: Preparation of Comparative Malonate Polyester Resin III In a similar way as under (I) were brought 4.341 moles of neopentyl glycol, 2.011 moles of hexahydrophthalic anhydride, 0.464 moles of Butyl ethyl propane diol and 0.0011 moles of butyl stannoic acid were brought in a reactor. The mixture was polymerised at 240° C. under nitrogen to an acid number of 0.2 mg KOH/g. The mixture was cooled down to 130° C. and 2.609 moles of diethylmalonate were added. The reaction mixture was heated to 170° C. and ethanol was removed under reduced pressure. The nearly colourless material was cooled down and diluted with 178 g of butyl acetate to a 85% solid content. The final resin had an acid number of 0.3 mg KOH/g solids, an OH value of about 60 mg KOH/g solids. The resin was diluted to 85% solids with butyl acetate.

Preparation of Paint

Paints were prepared according the composition in the table. The pigment was dispersed in the mixture of Disperbyk and Sartomer (which is cross-linkable component B: DiTMPTA is di-trimethylolpropane-tetraa.crylate) with a high shear stirrer for 15 minutes. Then the other ingredients were added under stirring. Prior to application the catalyst solution was added.

Preparation of the Catalyst Solution

A catalyst solution was formed as follows: to 8.03 g of a 55% solution of tetra-butylammoniumhydroxide were added 11.05 g of diethylcarbonate and 6.74 g of isopropanol.

| | | | |
|---|---|---|---|
| Sartomer SR355 | 17.77 | 17.59 | 17.41 |
| Disperbyk 163 | 1.11 | 1.10 | 1.09 |
| Kronos 2310 | 37.27 | 36.91 | 36.53 |
| Example Resin I | 29.95 | | |
| Example Resin II | | 29.66 | |
| Comparative Resin III | | | 29.36 |
| OHV (mg KOH/g) | 8 | 30 | 60 |
| Sartomer SR355 | 1.71 | 1.69 | 1.67 |
| Ethyl acetoacetate | 1.66 | 1.64 | 1.63 |
| Byk 310/315 [1:4] | 0.28 | 0.28 | 0.27 |
| Succinimide | 0.44 | 0.43 | 0.43 |
| Benzotriazole | 0.00 | 0.00 | 0.00 |
| Methyl ethyl ketone | 3.35 | 3.32 | 3.29 |
| Butyl acetate | 1.17 | 1.16 | 1.15 |
| Propanol | 0.56 | 0.55 | 0.55 |
| Thinner | 4.66 | 4.61 | 4.57 |
| Catalyst solution | 2.51 | 2.48 | 2.46 |
| Total | 100.00 | 100.00 | 100.00 |
| Hardness Persoz (after 3 days) | 118 | 88 | 19 |
| Drying time | 1 h 10 | +4 hrs | +24 hrs |

The examples above show that the hardness of the coating composition strongly depends on the hydroxy value of the resin. A hydroxy value of 60 or more will lead to an unacceptable long drying time and a very slow hardness built.

Prior Art Comparative Resin Example

WO 2011/055463, describes in Example 4 Formulations made from a malonate polyester component A-1 and TMPA as the cross-linkable component B-1 and various catalysts. The malonate polyester A-1 had an OH value of 83.2 mg KOH/g. Apart from the hydroxy value, the malonate polyester A-1 is similar to the above described malonate polyester I and II. The catalyst C-5 (tetrabutylammonium ethylcarbonate) that has been used is the catalyst used in the above paint formulations. The Perzos hardness was 65 after 1 month curing time, whereas the resin according to the invention having a low hydroxy value as a significantly higher hardness (88) already after three days curing time.

The invention will be further illustrated by the following specific examples, which are exemplary only.

Molecular weights were measured by GPC in THF, and expressed in polystyrene equivalent weights. Viscosities were measured with a TA Instruments AR2000 Rheometer, using a cone and plate setup (cone 4 cm 1°) at 1 Pa stress.

Tube and ball method for pot lift determination: A flat bottomed test tube (internal diameter 15 mm, length 12.5 cm), carrying two marks, 5 cm apart is filled with 20 ml of paint. A steel ball with a diameter of 8 mm is added, and the tube is closed with a snap cap. The tube is held under an angle of 10° and the steel ball is allowed to roll on the wall of the test tube. The time needed to roll between the two marks is taken as a measure for the viscosity. The time needed to double in viscosity is taken as the pot life. If necessary this time is calculated by linear interpolation between two measurements. This method was used for the pigmented formulations. For the clear formulations, a glass test tube (length 12 cm, diameter 13 mm) was filled with a stainless steel ball of 12 mm diameter, and the formulation to be studied to leave a very limited head space, and closed. Time was recorded for the ball to fall and pass a distance of 5 cm when the tube was tilted vertically. An average was taken over 2 measurements.

Drying recorder drying time: For determining the recorder drying time, paint was applied on a glass panel with a doctor blade with a 90µ gap. The drying time was measured with a Gardco electronic drying time recorder, type DT-5020, set on a cycle time of 60 minutes. Drying time was recorded as the time were the stylus left no more visible trace on the film.

TNO cotton ball drying times: Dust-dry and tack-free times were measured according to the so-called TNO method with a wad of cotton-wool. Dust-dry time means the time needed for the coating after dropping the wad on the surface of the coating and after leaving it there for 10 seconds, to get no residue of the wool-cotton sticking onto the surface after blowing away the wad. For tack-free time the same holds but now a weight load of 1 kg is applied on the wad for 10 seconds.

Persoz hardness measurement: Persoz pendulum hardness was measured in a climatized room at 23° C., and 55+/−5% relative humidity. Hardness is measured with a pendulum acc. Persoz as described in ASTM D 4366. For the gradient layer thickness panels, hardness is measured at different spots and corresponding layer thickness is measured. If necessary the hardness at a certain layer thickness is calculated by linear interpolation of the measurement at two different layer thicknesses. Layer thicknesses were measured with a Fischer Permascope MP40E-S.

Optical evaluation spayed pigmented paints: Paint was sprayed with a devilbiss spraygun, nozzle FF-1.4 with an air pressure of 3.5 bar. The paint was prayed in a continuous layer over the entire surface of a 55×10 cm steel panel. A consecutive layer was sprayed starting 10 cm from the right edge. Several layers were built up, moving to the right so that a layer thickness gradient was build up from the left to right. Films were allowed to dry horizontally at 23° C., 45% RH. Layer thicknesses were measured with a Fischer Permascope MP40E-S. At 100µ layer thickness, a picture was taken with an Olympus SZX10 microscope (1× magn) equipped with a digital camera.

Wavescan analysis: The panels as described above were analyzed using the Wavescan II of Byk instruments. Data were stored using Autochart software from Byk. Analysis was done in the direction perpendicular to the thickness gradient. In this instrument the light of small laser diode is reflected by the surface of the sample under an angle of 60°, and the reflected light is detected at the gloss angle (60° opposite). During the measurement, the "wave-scan" is moved across the sample surface over a scan length of approx. 10 cm, with a data point being recorded every 0.027 mm. The surface structure of the sample modulates the light of the laser diode. The signal is divided into 5 wavelength ranges in the range of 0.1-30 mm and processed by mathematical filtering. For each of the 5 ranges a characteristic value (Wa 0.1-0.3 mm, Wb 0.3-1.0 mm, Wc 1.0-3.0 mm, Wd 3.0-10 mm, We 10-30 mm) as well as the typical wavescan-values longwave (LW, approx. 1-10 mm) and shortwave (SW, approx. 0.3-1 mm) is calculated. Low values mean a smooth surface structure. Additionally a LED light source is installed in the wave-scan DOI and illuminates the surface under 20 degrees after passing an aperture. The scattered light is detected and a so-called dullness value (du, <0.1 min) is measured. By using the three values of the short wave range Wa, Wb and du a DOI value is calculated. (see Osterhold e.a., Progress in Organic Coatings, 2009, vol. 65, no 4, pp. 440-443).

The following abbreviations were used for chemicals used in the experiments: DiTMPTA is di-trimethylolpropane-tetraacrylate (obtained from Aldrich (MW=466 g/mol)) or used as Sartomer SR355 (supplied commercially by Sartomer); Disperbyk 163 is a dispersant commercially supplied by Byk; Byk 310 and 315 are additives commercially supplied by ByK; Kronos 2310 is a TiO2 pigment commercially supplied by Kronos, TBAH is tetrabutylammonium hydroxide, BuAc is Butyl acetate, MEK is Methyl ethyl ketone (2-Butanone); EtAcAc is ethyl acetoacetate; DEC is diethyl carbonate; IPA is isopropanol; RT is room temperature.

Preparation of Malonate Polyester A According to the Invention

Into a reactor provided with a distilling column filed with Raschig rings were brought 17.31 mol of neopentyl glycol, 8.03 mol of hexahydrophthalic anhydride and 0.0047 mol of butyl stannoic acid. The mixture was polymerised at 240° C. under nitrogen to an acid number of 0.2 mg KOH/g. The mixture was cooled down to 130° C. and 10.44 mol of diethylmalonate was added. The reaction mixture was heated to 170° C. and ethanol was removed under reduced pressure. The nearly colourless material was cooled down and diluted with 420 g of butyl acetate to a 90% solid content. The final resin had an acid number of 0.3 mg KOH/g solids, an OH value of 20 mg KOH/g solids and a weight average molecular weight of 3400 Da.

Catalyst Solution C1

Catalyst solution was prepared by reacting 59.4 g a TBAH solution (40% in water) with 13.5 g DEC (reacting overnight at RT), with 14.5 g isopropanol as co-solvent, following the corresponding ethocarbonate species development. Titration indicated that blocking was complete, and that the concentration of blocked base was 0.83 meq/g solution.

Catalyst Solution C2

To 43.6 g of a 45% aqueous solution of TBAH were added 36.6 g of isopropanol and 60 g of DEC. After standing overnight the mixture was filtered over paper. Titration showed that the catalyst contained 0.52 meq of blocked base per gram solution.

No-D Example Formulation 1, Example Formulations 1-4

Formulations were prepared based on a malonate donor resin A, DiTMPTA as acryloyl donor resin, and the indicated amount of succinimide, and thinned to a viscosity of 160 mPas with a mixture of MEK/BuAc 1:1 by volume. This was mixed with an amount of catalyst solution C1. Listed in table A are the details of the overall composition. Catalyst amounts are 50 meq/g solids, water levels are 1.8 wt %, isopropanol at 0.7 wt %, ethanol level estimated at 0.2 wt %.

TABLE A

| Code | No-D1 | Ex 1 | Ex 2 | Ex 3 | Ex 4 |
|---|---|---|---|---|---|
| malonate ester A/g | 15.0 | 15.0 | 15.0 | 15.0 | 15.0 |
| di-TMPTA/g | 6.6 | 6.6 | 6.6 | 6.6 | 6.6 |
| succinimide/mg | 0 | 149 | 174 | 199 | 298 |
| mole % succinimide on cat | 0 | 150 | 175 | 200 | 300 |
| MEK/BuAc (1:1)/g | 4.5 | 4.5 | 4.5 | 4.5 | 4.5 |
| catalyst C1/g | 1.2 | 1.2 | 1.2 | 1.2 | 1.2 |

Of these formulations, the drying behaviour at room temperature for films leading to a dry film thickness of around 70-75 mu was followed with TNO cotton ball drying tests, and Persoz pendulum hardness development was determined; also these results are listed in Table B.

TABLE B

| Code | No-D1 | Ex 1 | Ex 2 | Ex 3 | Ex 4 |
|---|---|---|---|---|---|
| mole % succinimide on cat TNO-drying | 0 | 150 | 175 | 200 | 300 |
| dust-dry (min) | 10' | 25' | 25' | 30' | 65' |
| tack-free (min) | 10' | 30' | 30' | 35' | 70' |
| Persoz hardness (sec) after time at RT: | | | | | |
| 4 h | 31 | | | 107 | 132 |
| 1 night | 42 | | | 126 | 152 |
| 1 week | 66 | 131 | 137 | 146 | 231 |

It can be seen that whereas No-D example 1 shows an extremely fast drying, the actual Persoz hardness levels are low presumably due to solvent entrapment in the system. Moreover, the appearance of this No-D example 1 is poor. Upon addition of low levels of succinimide (slightly higher than the levels of catalyst used), some retardation of the drying is seen, but still giving drying times considered as fast; however, it can also be observed that the Persoz hardness development is strongly improved. Simultaneously, the example films with succinimide exhibit a better appearance than No-D example 1.

Example formulations 5-7, and No-D example formulations 2-3 were prepared as pigmented paints, having compositions as tabulated in Table C (amounts in grams).

TABLE C

| Code | Ex 5 | Ex 6 | Ex 7 | No-D2 | No-D3 |
|---|---|---|---|---|---|
| Sartomer SR355 | 38.19 | 38.19 | 38.19 | 38.19 | 39.19 |
| Disperbyk 163 | 2.39 | 2.39 | 2.39 | 2.39 | 2.39 |
| Kronos 2310 | 80.12 | 80.12 | 80.12 | 80.12 | 80.12 |
| malonate polyester A | 58.70 | 67.69 | 67.69 | 58.70 | 67.69 |
| Sartomer SR 355 | 4.22 | 1.15 | 1.15 | 4.22 | 4.22 |
| EtAcAc | 4.81 | 0.00 | 0.00 | 4.81 | 0.00 |
| Byk 310/315 [1:4 by mass] | 0.60 | 0.60 | 0.60 | 0.60 | 0.60 |
| Succinimide | 0.79 | 0.79 | 1.58 | 0.00 | 0.00 |
| BuAc | 2.52 | 2.52 | 2.52 | 2.52 | 2.52 |
| MEK | 7.20 | 7.20 | 7.20 | 7.20 | 7.20 |
| catalyst solution C2 | 9.34 | 9.34 | 9.34 | 9.34 | 9.34 |
| recorder drying time (min) | 14 | 15 | 44 | 4.3 | 8 |
| potlife (min) | 39 | 35 | 37 | 17 | 29 |
| Persoz hardness (sec) after 24 h (50 mu dry film) | 147 | 147 | 145 | 85 | 66 |

Pot life of these pigmented paints were measured, and drying times of these paints drawn onto glass panels were determined with a drying recorder. These paints were also applied by spraying onto a steel panel to obtain gradient film thickness panel. Persoz hardness at 50 mu dry film thickness was determined after 24 hr RT cure; microscope pictures were taken of the resulting coatings on these panels at approximately 100 mu dry film thickness. Also, pot life of these paints were measured. Results are included in table C.

It can be observed from a comparison of No-D example 3 with examples 6 and 7, that the addition of succinimide to the formulation gives clear advantages in Persoz hardness build-up, and some advantage in pot life. Example 7, with a higher level of succinimide, shows a significant increase in drying time, the 44 minute value can however still be considered as an acceptable to good value. Appearance of panels from examples 6 and 7 is much better than that of panels from No-D example 3, as can be judged from comparing the microscope photographs, No-D example 3 showing many more defects.

Similar conclusions can be drawn from a comparison of No-D example 2, with example 5, now based on a formulation with acetoacetate included besides malonate as RMA donor groups. Example 5 (with succinimide added) exhibits higher Persoz hardness, a better pot life, and a better appearance than No-D example 2 (not containing succinimide).

Example 8 was prepared and evaluated in a similar way as discussed above for example 5-7, the composition and results given below in table D (amounts in grams). It can be seen that the additional presence of 1,2,4-triazole (when compared to example 6) leads to a significant improvement in pot-life, other advantages being retained.

TABLE D

| Code | Ex 8 |
| --- | --- |
| Sartomer SR355 | 38.19 |
| Disperbyk 163 | 2.39 |
| Kronos 2310 | 80.12 |
| Malonate polyester A | 67.69 |
| Sartomer SR 355 | 1.15 |
| EtAcAc | 0.00 |
| Byk 310/315 [1:4 by mass] | 0.60 |
| 1,2,4-triazole | 0.96 |
| Succinimide (s) | 0.79 |
| BuAc | 2.52 |
| MEK | 7.20 |
| catalyst solution C2 | 9.34 |
| recorder drying time (min) | 16 |
| Potlife (min) | 70 |
| Persoz hardness (sec) after 24 h (50 mu dry film) | 147 |

Example formulations 9 and 10, and No-D example formulations 4 and 5 were formulated and evaluated along similar lines, now also including Wavescan analysis to have a quantitative indication of the quality of the appearance. Compositions and results are given in Table E (amounts in grams).

TABLE E

| Code | Ex 9 | Ex 10 | No-D4 | No-D5 |
| --- | --- | --- | --- | --- |
| Sartomer | 19.07 | 19.07 | 19.07 | 19.07 |
| Disperbyk 163 | 1.19 | 1.19 | 1.19 | 1.19 |
| Kronos 2310 | 40.01 | 40.01 | 40.01 | 40.01 |
| Malonate polyester A | 29.35 | 33.85 | 29.35 | 33.85 |
| Sartomer SR 355 | 2.11 | 0.58 | 2.11 | 0.58 |
| EtAcAc | 2.41 | — | 2.41 | — |
| Byk 310/315 [1:4 by mass] | 0.30 | 0.30 | 0.30 | 0.30 |
| Succinimide | 0.40 | 0.40 | — | — |
| BuAc | 1.26 | 1.26 | 1.26 | 1.26 |
| MEK | 3.60 | 3.60 | 3.60 | 3.60 |
| Catalyst solution C2 | 4.67 | 4.67 | 4.67 | 4.67 |
| Persoz hardness (s) at 50μ | 122 | 125 | 97 | 93 |
| Layer thickness (μ) | 51 | 56 | 58 | 58 |
| du (dullness) | 6.30 | 6.40 | 8.80 | 11.30 |
| Longwave | 3.80 | 1.90 | 5.30 | 7.80 |
| Shortwave | 2.20 | 6.40 | 18.20 | 24.10 |
| DOI (Dorigon) | 94.10 | 93.90 | 91.50 | 88.40 |
| Layer thickness (μ) | 92 | 93 | 92 | 86 |
| du (dullness) | 5.90 | 8.70 | 11.60 | 23.40 |
| Longwave | 1.00 | 3.70 | 11.50 | 25.10 |
| Shortwave | 9.50 | 24.90 | 29.70 | 60.60 |
| DOI (Dorigon) | 94.10 | 90.20 | 88.10 | 74.90 |

Example formulation 9 can be compared with No-D formulation example 4, example formulation 10 can be compared with No-D formulation example 5, difference being the presence of low amounts of succinimide. It can from both comparisons be concluded that the presence of succinimide, besides the improved Persoz hardness, leads to significantly improved values for longwave and shortwave roughness, dullness and DOI.

Example 11: Impact on Conversion Kinetics

The conversion of the acryloyls in the system can be followed by MR, focusing on the 809 cm-1 band characteristic of the acryloyl. Doing that, the impact of added succinimide on total conversion can be made visible. Two systems were formulated (according to compositions of No-D example 1 (without succinimide) and example formulation 1 (with 150% succinimide relative to solids). FIG. 1 compares the conversion of these systems after application on top of an ATR crystal, the IR beam probing the deepest layers, close to the substrate. Initial conversion of the formulation without the succinimide is fast, which is also the cause for solvent entrapment and potential appearance problems. It can be seen that the addition of succinimide, even at these very low levels, leads to a significant retardation of the initial conversion; simultaneously, it illustrates that after this initial retardation period, the conversion rate is accelerating, so that the rate of cure towards higher conversions is still fast after this initial delay.

Example 12: Determination of Michael Addition Reactivity of Succinimide 5 grams of succinimide (50.5 mmole) were dissolved in a mixture of 42 grams of butyl acrylate and 42 grams of methanol, and maintained at room temperature as such, or after adding a strong base (9.82 grams of a 1.12 meq/g solution of tetrabutylammonium hydroxide in methanol, 11 meq). Subsequently, the concentration of succinimide is determined as a function of time by taking samples, neutralizing with a known excess of HCl in water, and backtitration with a KOH solution. Without base initiation, no significant loss of succinimide N—H in this solution is observed in two weeks. With the base added, the succinimide concentration can be seen to decrease with time, as illustrated in the table F below. Succinimide concentration is expressed as % relative to the theoretical level based on used amounts.

TABLE F

| Time (min) | Succinimide remaining (%) |
| --- | --- |
| 3 | 99 |
| 30 | 87 |
| 60 | 77 |
| 120 | 60 |
| 180 | 48 |

At this catalyst level ([succinimide]/[base]=5), it takes about an hour to lose 25% of the succinimide acidic protons to be consumed. Under these conditions, dimethylmalonate (instead of succinimide) would react much faster with the acrylate.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A polymeric or oligomeric resin A, comprising one or more reactive components A having a structure according to formula 1:

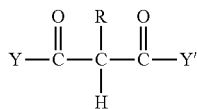

Formula 1 wherein R is hydrogen or an alkyl, aralkyl or aryl substituent and Y and Y' are same or different alkyl, aralkyl or aryl (R*), alkoxy (—OR*) groups or a polymer backbone or wherein the —C(=O)—Y and/or —C(=O)—Y' is replaced by CN or phenyl, wherein the polymeric or oligomeric resin A is a polyester, polyether, polyepoxy, polyurethane or polycarbonate, comprising reactive component A, wherein the resin A is produced by transesterification of a polyester, polyether, polyepoxy, polyurethane, or polycarbonate polyol with an acetoacetate or malonate reactive component A in the form of a carboxylic acid ester, and wherein the obtained resin A has a hydroxy number of less than 60 mg KOH/g solids, has a number average molecular weight between 100-20000 g/mol, an equivalent weight per reactive component A of 100-2000 g/mol and an acid number less than 4 mg KOH/g.

2. The resin A according to claim 1, wherein more than 50% of the reactive components A in the polymeric or oligomeric resin A are malonate groups.

3. The resin A according to claim 1, wherein more than 60% of the reactive components A in the polymeric or oligomeric resin A are malonate groups.

4. The resin A according to claim 1, comprising an average of 2 to 20 active C—H functions per molecule.

5. The resin A according to claim 1, comprising an average of 4 to 10 active C—H functions per molecule.

6. The resin A according to claim 1, having a hydroxy number of less than 40 mg KOH/g solids.

7. The resin A according to claim 1, comprising both malonate and acetoacetate groups.

8. The resin A according to claim 1, wherein the polymer or oligomer resin A is produced by transesterification of a polyester polyol.

9. The resin A according to claim 1, wherein the polymer or oligomer resin A is produced by transesterification of a polyester polyol with esters of malonic acid or ethylacetoacetic acid.

10. The resin A according to claim 8, wherein the polyester polyol is prepared by reacting a hydroxyl functional polyester polyol with lactone chain extenders or by reacting a polyester bearing both hydroxyl and acid groups with one or more mono- or polyfunctional epoxy compounds.

11. The resin A according to claim 1, having a glass transition temperature between −25 and +25° C.

12. The resin A according to claim 1, comprising at most 60 wt. % aromatic constituents.

13. The resin A according to claim 1, comprising at most 40 or at most 5 wt. % aromatic constituents.

\* \* \* \* \*